US008573055B2

(12) United States Patent
Itakura (10) Patent No.: US 8,573,055 B2
(45) Date of Patent: Nov. 5, 2013

(54) ANGULAR VELOCITY SENSOR (75) Inventor: Toshikazu Itakura, Toyota (JP)

(73) Assignees: DENSO CORPORATION, Kariya (JP); Toyota Jidosha Kabushiki Kaisha, Toyota (JP)

( * ) Notice: Subject to any disclaimer, the term of this patent is extended or adjusted under 35 U.S.C. 154(b) by 361 days.

(21) Appl. No.: 13/113,234

(22) Filed: May 23, 2011

(65) Prior Publication Data

US 2011/0283793 A1   Nov. 24, 2011

(30) Foreign Application Priority Data

May 24, 2010   (JP) ................................ 2010-118305

(51) Int. Cl.
*G01C 19/56* (2012.01)

(52) U.S. Cl.
USPC ......................................... 73/504.12; 73/1.37

(58) Field of Classification Search
USPC .................................... 73/1.37, 1.77, 504.12
See application file for complete search history.

(56) References Cited

U.S. PATENT DOCUMENTS

| 5,471,396 A | 11/1995 | White |
| 6,267,008 B1 | 7/2001 | Nagao |
| 2010/0107759 A1 | 5/2010 | Kato |

FOREIGN PATENT DOCUMENTS

| JP | A-5-107292 | 4/1993 |
| JP | A-5-172890 | 7/1993 |
| JP | A-2000-332567 | 11/2000 |
| JP | A-2009-63328 | 3/2009 |
| WO | 2009150898 A1 | 12/2009 |

OTHER PUBLICATIONS

Office Action dated May 10, 2013 in corresponding DE patent application No. 102011076208.6 (and English translation).

*Primary Examiner* — John Chapman, Jr.
(74) *Attorney, Agent, or Firm* — Posz Law Group, PLC (57) ABSTRACT An angular velocity sensor includes a sensor unit, a detection unit and a connecting part electrically connecting the sensor unit and the detection unit. The detection unit drives the sensor unit and detects an angular velocity acting on the sensor unit. The detection unit supplies a carrier signal to a movable electrode of a capacitor of the sensor unit and supplies a driving signal to a fixed electrode of the capacitor via the connecting part for performing a servo control. A C/V converter circuit of the detection unit receives capacitance generated at the capacitor through a driving signal transmission line of the connecting part in a state where supply of the driving signal is stopped, and converts the capacitance into a voltage. A determination part of the detection unit determines whether the driving signal transmission line has disconnection or not based on the voltage outputted from the C/V converter circuit.

7 Claims, 4 Drawing Sheets

ANGULAR VELOCITY SENSOR

CROSS REFERENCE TO RELATED APPLICATION

This application is based on Japanese Patent Application No. 2010-118305 filed on May 24, 2010, the disclosure of which is incorporated herein by reference.

FIELD OF THE INVENTION

The present invention relates to an angular velocity sensor. More particularly, the present invention relates to a vibration-type angular velocity sensor that has a movable part movable in a first direction and a second direction perpendicular to the first direction, and detects an angular velocity applied around an axis perpendicular to the first direction and the second direction based on vibration of the movable part in the second direction in a state where the movable part is vibrating in the first direction.

BACKGROUND OF THE INVENTION

In general, a vibration-type angular velocity sensor has a movable part, that is, a vibrator that is movable in a direction along an X-axis (hereinafter, X-axis direction) and a direction along a Y-axis (hereinafter, the Y-axis direction).

The vibrator is regularly vibrated in the X-axis direction. When an angular velocity is applied around a Z-axis that is perpendicular to the X-axis and the Y-axis, the vibrator vibrates in the Y-axis direction due to Coriolis force caused by the angular velocity. The angular velocity sensor detects the angular velocity based on vibration of the vibrator in the Y-axis direction. Such a vibration-type angular velocity sensor is, for example, described in Japanese Patent Application Publication No. 2009-63328 (hereinafter, referred to as the publication 1).

In an angular velocity sensor, although a vibrator is vibrated in the X-axis direction, a vibration component in the Y-axis direction will be generated due to machining error of the vibrator and the like. That is, the vibrator may vibrate obliquely due to the machining error. In such an oblique vibration state, detection accuracy of the angular velocity is reduced.

Therefore, a servo control has been proposed in order to restrict the oblique vibration. In the servo control, an external force, such as an electrostatic force, in the Y-axis direction is generated by applying a predetermined driving signal to the vibrator.

A sensor unit having the vibrator is formed in a first semiconductor chip, and a detection unit for performing the servo control and detecting the angular velocity is formed in a second semiconductor chip. The first and second semiconductors are electrically connected to each other through a connecting portion, such as bonding wires or bumps formed in the semiconductor chips. The driving signal for performing the servo control is transmitted from the detection unit to the vibrator through the connecting portion.

If the connecting portion has disconnection, the angular velocity will not be accurately detected, as well as a malfunction will occur. Therefore, various means for detecting the disconnection have been proposed.

For example, Japanese Patent Application Publication No. 5-107292 (hereinafter, referred to as the publication 2) describes a disconnection detector for detecting disconnection of a signal line and a pair of power supply lines, which electrically connect between a sensor and an A/D converter for converting an output signal of the sensor into a digital value. In the disconnection detector of the publication 2, multiple resistors are connected between the signal line and each of the power source lines. If the signal line or the power source line has disconnection, an input voltage to the A/D converter becomes a different voltage level from a regular voltage level. The disconnection of the signal line or the power source lines can be detected based on the difference of the voltage level.

If the technique of the publication 2 is employed for detecting disconnection of the connecting portion of the vibration-type angular velocity sensor, the following drawbacks arise. In the nature of the servo control for reducing the oblique vibration of the vibrator, if the vibrator is ideally machined, the vibrator merely vibrates in the X-axis direction in a state where an angular velocity is not applied. That is, since the vibrator does not vibrate obliquely, it is not necessary to apply the external force by the servo control. Therefore, because the driving signal for the servo control does not pass through the connecting portion, the disconnection of the connecting portion cannot be detected.

SUMMARY OF THE INVENTION

The present invention is made in view of the foregoing matter, and it is an object of the present invention to provide an angular velocity sensor capable of determining disconnection of a driving signal transmission line of a connecting part that electrically connects a sensor unit and a detection unit.

According to an aspect of the present invention, an angular velocity sensor includes a sensor unit, a detection unit, and a connecting part electrically connecting the sensor unit and the detection unit. The sensor unit includes a movable part that is movable in a first direction along a first axis and a second direction along a second axis, the second axis being perpendicular to the first axis. The detection unit is configured to drive the sensor unit and detect an angular velocity of rotation about a third axis that is perpendicular to the first axis and the second axis.

The sensor unit further includes a vibrating part, a vibration correcting part and an output part. The vibrating part is configured to vibrate the movable part in the first direction based on a vibration signal fed from the detection unit. The vibration correcting part is configured to move the movable part in the second direction based on a driving signal fed from the detection unit. The output part is configured to generate a detection signal in accordance with vibration of the movable part in the second direction. The vibration correcting part includes a movable electrode and a driving electrode, the movable electrode being disposed in the movable part and receiving a carrier signal, the driving electrode being opposed to the movable electrode and generating an electrostatic force between the movable electrode and the driving electrode to move the movable part in the second direction as receiving the driving signal. The connecting part includes a driving signal transmission line for transmitting the driving signal from the detection unit to the sensor unit.

The detection unit further includes a vibration signal supplying part, a driving signal supplying part, a second-axis vibration extracting part, an angular velocity detecting part, a second-axis vibration restricting part, a C/V converter circuit and a determination part. The vibration signal supplying part is configured to generate the vibration signal supplied to the vibrating part. The driving signal supplying part is configured to generate the driving signal supplied to the vibration correcting part. The second-axis vibration extracting part is configured to generate a second-axis vibration signal that indicates a vibration component of the movable part in the second direction based on the detection signal generated from the output part in a state where the movable part is vibrated in the first direction. The angular velocity detecting part is configured to detect the angular velocity based on the second-axis vibration signal. The second-axis vibration restricting part is configured to control the driving signal supplying part based on the second-axis vibration signal so that vibration of the movable part in the second direction is restricted. The C/V converter circuit is configured to receive a capacitance between the movable electrode and the driving electrode through the driving signal transmission line in a state where supply of the driving signal is stopped, and convert the capacitance into a voltage. The determination part is configured to determine whether the driving signal transmission line has disconnection or not based on the voltage outputted from the C/V converter circuit.

In such a configuration, in a normal operation for detecting an angular velocity, the movable part is regularly vibrated in the first direction. In such a condition, if an angular velocity around the third axis acts on the movable part, the movable part vibrates in the second direction due to Coriolis force. Thus, the angular velocity is detected based on the vibration component in the second direction caused by the Coriolis force.

At this time, the second-axis vibration restricting part feedback-controls the driving signal supplying part based on the vibration component in the second direction indicated by the second-axis vibration signal so that the vibration of the movable part in the second direction is restricted. That is, the second-axis vibration restricting part controls the driving signal supplying part so that an electrostatic force for restricting the vibration of the movable part in the second direction is generated between the movable electrode to which the carrier signal is applied and the driving electrode. By such a servo control, oblique vibration of the movable part caused by machining error or the like is reduced, and the movable part can be simply vibrated in the first direction.

In the above configuration, further, whether the driving signal transmission line has disconnection or not can be detected. The C/V converter circuit receives the capacitance of a capacitor provided by the movable electrode and the driving electrode through the driving signal transmission line in a state where the supply of the driving signal is stopped, and converts the capacitance into the voltage. The capacitance changes in accordance with the carrier signal applied to the movable electrode. Therefore, in a normal state where the driving signal transmission line has no disconnection, the voltage outputted from the C/V converter circuit changes in accordance with the carrier signal. On the other hand, in a disconnection state where the driving signal transmission line has disconnection, the voltage outputted from the C/V converter circuit becomes a constant value. Accordingly, the determination part determines whether the driving signal transmission line has disconnection or not based on the voltage outputted from the C/V converter circuit.

In this way, disconnection of the driving signal transmission line can be detected. Also, the determination of disconnection is made based on the voltage outputted from the C/V converter. Therefore, it is possible to detect the disconnection, even if the movable part is in an ideal condition without causing oblique vibration.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EXEMPLARY EMBODIMENTS (First Embodiment)

A first embodiment of the present invention will be described hereinafter with reference to FIGS. 1 through 3.

Figure 1:
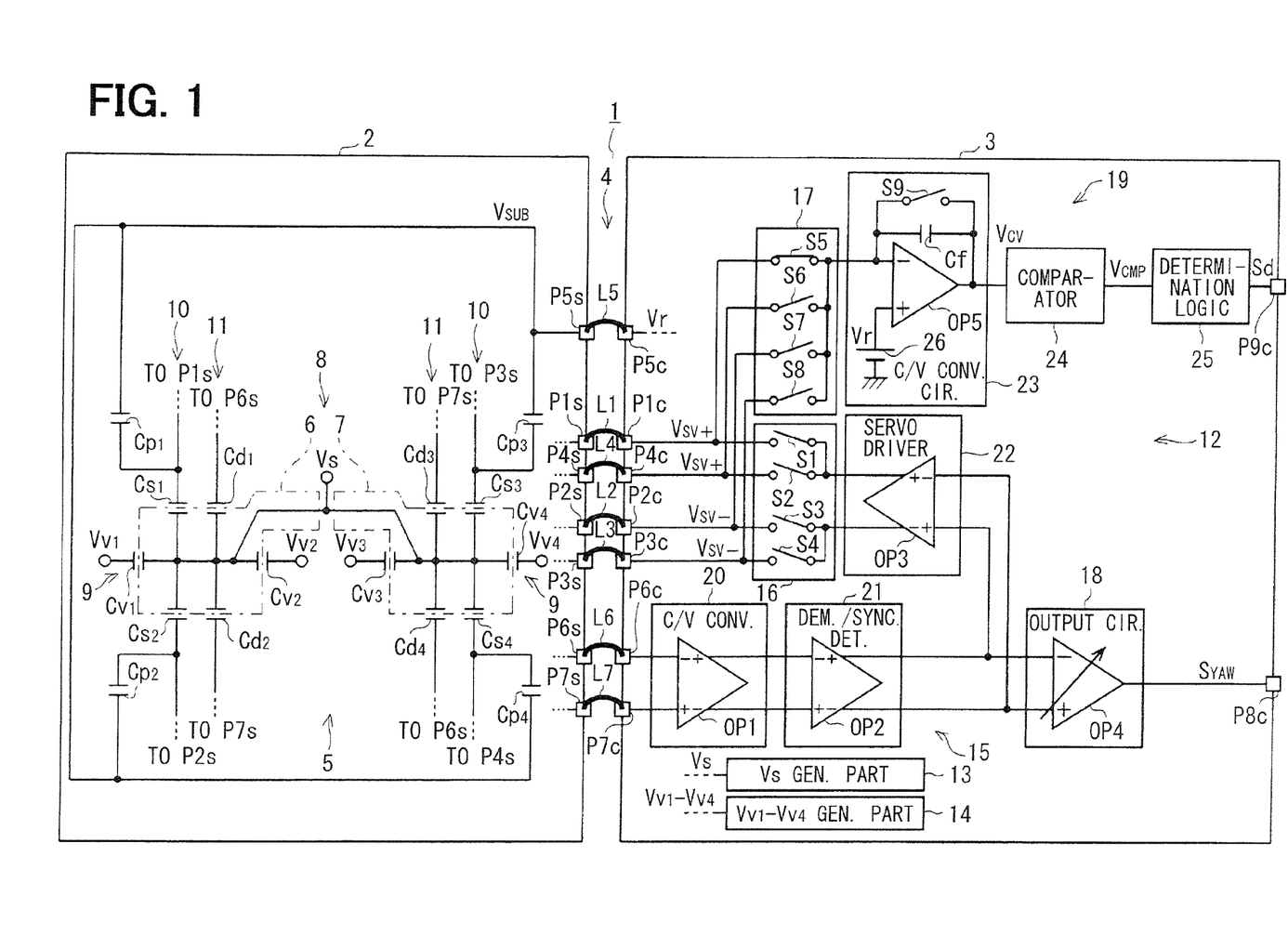
FIG. 1 is a schematic diagram of an angular velocity sensor according to a first embodiment of the present invention.
Figure 2:
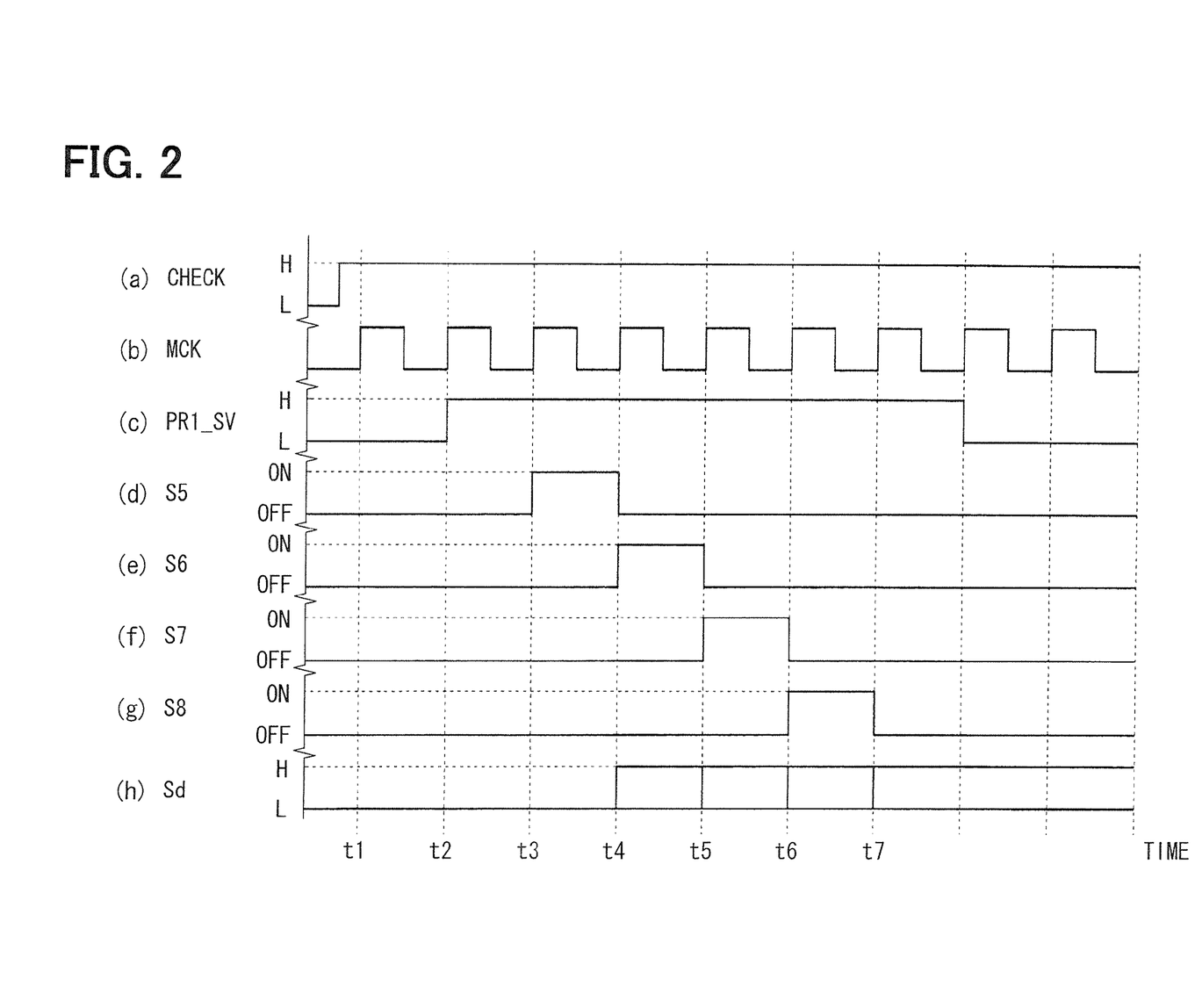
FIG. 2 is a time chart relating to a second disconnection detecting operation according to the first embodiment, in which (a) is a disconnection-detection starting signal, (b) is a main clock signal, (c) is an internal disconnection-detection starting signal, (d) through (g) are on and off states of switches, and (h) is a determination signal.

Referring to FIG. 1, an angular velocity sensor 1 is, for example, employed as a yaw rate sensor. The angular velocity sensor 1 generally includes a sensor chip 2 as a first semiconductor chip, a circuit chip 3 as a second semiconductor chip, and a connecting part 4 that electrically connects the sensor chip 2 and the circuit chip 3.

The connecting part 4 includes multiple connection lines. The sensor chip 2 and the circuit chip 3 are connected through the multiple connection lines by a flip-chip bonding technique. In FIG. 1, only seven connection lines, such as lines L1 through L7, are exemplarily illustrated. It is to be noted that the connection lines mean bonding portions or connecting portions between bumps formed on the sensor chip 2 and the circuit chip 3. The sensor chip 2 is provided with terminals P1s through P7s. The circuit chip 3 is provided with terminals P1c through P7c. The terminals P1s through P7s are connected to the terminals P1c through P7c through the connection lines L1 through L7.

A sensor unit 5 is formed in the sensor chip 2. The sensor unit 5 includes a movable part 8, a vibrating part 9 disposed on a periphery of the movable part 8, a vibration correcting part 10 and an output part 11. The movable part 8 has vibrators 6, 7 that are movable in a direction along an X-axis and a direction along a Y-axis. The X-axis and the Y-axis are included in a horizontal plane and are perpendicular to each other.

The direction along the X-axis is hereinafter referred to as the X-axis direction and the direction along the Y-axis is hereinafter referred to as the Y-axis direction. The X-axis direction and the Y-axis direction are perpendicular to each other. Further, the X-axis corresponds to a first axis, and the Y-axis corresponds to a second axis. Therefore, the X-axis direction corresponds to a first direction and the Y-axis direction corresponds to a second direction.

In a state where the vibrators 6, 7 are vibrating in the X-axis direction, if an angular velocity in a direction around a Z-axis is applied, the vibrators 6, 7 are vibrated in the Y-axis direction at amplitude according to the angular velocity due to Coriolis force. The Z-axis is perpendicular to the X-axis and the Y-axis. The X-axis corresponds to a third axis, and a direction along the Z-axis corresponds to a third direction.

The vibrating part 9 has capacitors Cv1 through Cv4 that generate electrostatic force for displacing the vibrators 6, 7 in the X-axis direction. Each of the capacitors Cv1 through Cv4 has a movable electrode and a fixed electrode. The movable electrodes of the capacitors Cv1, Cv2 are provided by portions of the vibrator 6, and thus are moved with the vibrator 6. The movable electrodes of the capacitors Cv3, Cv4 are provided by portions of the vibrator 7, and thus are moved with the vibrator 7.

The movable electrodes of the capacitors Cv1 through Cv4 are applied with a carrier signal (modulation signal) Vs from the circuit chip 3 through the connecting part 4. The carrier signal Vs has a rectangular waveform with constant amplitude and predetermined frequency that is sufficiently higher than resonance frequency of vibrations of the vibrators 6, 7. The fixed electrodes of the capacitors Cv1 through Cv4 are applied with vibration signals Vv1 through Vv4 from the circuit chip 3 through the connecting part 4.

The vibration correcting part 10 has capacitors Cs1 through Cs4 that generates electrostatic force for displacing the vibrators 6, 7 in the Y-axis direction. Each of the capacitors Cs1 through Cs4 has a movable electrode and a fixed electrode. The movable electrodes of the capacitors Cs1, Cs2 are provided by portions of the vibrator 6, and are moved with the vibrator 6. The movable electrodes of the capacitors Cs3, Cs4 are provided by portions of the vibrator 7, and are moved with the vibrator 7. The movable electrodes of the capacitors Cs1 through Cs4 are applied with a carrier signal Vs from the circuit chip 3 through the connecting part 4.

The fixed electrodes of the capacitors Cs1 through Cs4 are connected to the terminals P1s through P4s. The terminals P1s, P4s receive driving signals Vsv+ from the circuit chip 3 through the connection lines L1, L4. The terminals P2s, P3s receive driving signals Vsv− from the circuit chip 3 through the connection lines L2, L3. The fixed electrodes of the capacitors Cs1 through Cs4 correspond to driving electrodes.

The sensor unit 5 is applied with a voltage Vr from the circuit chip 3 through the connection line L5 and the terminal P5s, as substrate potential VSUB. Parasitic capacitance Cp1 through Cp4 is formed between the fixed electrode of each of the capacitors Cs1 through Cs4 and the substrate potential VSUB.

The output part 11 includes a pair of capacitors Cd1, Cd2 in which capacitances mutually change in accordance with the displacement of the vibrator 6 in the Y-axis direction, and a pair of capacitors Cd3, Cd4 in which capacitances mutually change in accordance with the displacement of the vibrator 7 in the Y-axis direction.

Each of the capacitors Cd1 through Cd4 includes a movable electrode and a fixed electrode. The movable electrodes of the capacitors Cd1, Cd2 are provided by portions of the vibrator 6, and are moved with the vibrator 6. The movable electrodes of the capacitors Cd3, Cd4 are provided by portions of the vibrator 7, and are moved with the vibrator 7.

The movable electrodes of the capacitors Cs1 through Cs4 are applied with a carrier signal Vs from the circuit chip 3 through the connecting part 4. The fixed electrodes of the capacitors Cd1, Cd4 are connected to the terminal P6s, and the fixed electrodes of the capacitors Cd2, Cd3 are connected to the terminal P7s. In FIG. 1, connection between the fixed electrodes and the terminals are omitted.

In the sensor unit 5, the vibrators 6, 7 of the movable part 8 are regularly vibrated in the X-axis direction by suitably controlling vibration signals Vv1 through Vv4 generated in the circuit chip 3. In a state where the vibrators 6, 7 are vibrating in the X-axis direction, if rotation about the Z-axis acts on the sensor unit 5, Coriolis force according to a degree of angular velocity of the rotation is generated on the movable part 8. Thus, vibration in the Y-axis direction occurs.

In such a case, a vibration state in the Y-axis direction appears as a change in capacitance of the capacitors Cd1 through Cd4. The change in capacitance can be obtained as a detection signal. For example, as the electrode interval of the capacitors Cd1, Cd4 reduces, the capacitance at the capacitors Cd1, Cd4 increases. Also, as the electrode interval of the capacitors Cd2, Cd3 increases, the capacitance at the capacitors Cd2, Cd3 reduces.

A detection unit 12 is formed in the circuit chip 3. The detection unit 12 is configured to drive the sensor unit 5 and detect an angular velocity externally applied to the sensor unit 5. The detection unit 12 includes a modulation signal generating part 13, a vibration signal generating part 14, a control circuit 15, switching circuits 16, 17, an output circuit 18, and a disconnection detecting circuit 19.

The modulation signal generating part 13 generates the carrier signal Vs. The carrier signal Vs is fed to the sensor chip 2 through a connection line (not shown) of the connecting part 4.

The vibration signal generating part 14 generates the vibration signals Vv1 through Vv4. The vibration signals Vv1 through Vv4 are fed to the vibrating part 9 of the sensor chip 2 through a connection line (not shown) of the connecting part 4. Thus, the vibration signal generating part 14 corresponds to a vibration signal supplying part. As the fixed electrodes of the capacitors Cv1 through Cv4 of the vibrating part 9 are supplied with the vibration signals Vv1 through Vv4, the electrostatic force is generated in the capacitors Cv1 through Cv4 to move the vibrators 6, 7 in the X-axis direction.

Although not illustrated, the vibration signal generating part 14 is applied with an X-axis vibration signal indicating a vibration component of the vibrators 6, 7 in the X-axis direction from the sensor chip 2. The vibration signal generating part 14 performs feedback-control to generate the vibration signals Vv1 through Vv4 based on the X-axis vibration signal so that the vibrators 6, 7 vibrate in the X-axis direction at predetermined amplitude and frequency.

The control circuit 15 includes a C/V converter 20 and a demodulation/synchronous detector 21 for detecting an angular velocity. The control circuit 15 further includes a servo driver 22 for restricting vibration of the vibrators 6, 7 in the Y-axis direction. The C/V converter 20 and the demodulation/synchronous detector 21 correspond to a second-axis vibration extracting part. The servo driver 22 corresponds to a second-axis vibration restricting part and a driving signal supplying part.

The C/V converter 20 includes a fully differential-type operation amplifier OP1 as a main component. Input terminals of the C/V converter 20 are connected to the terminals P6c, P1c. The C/V converter 20 coverts the capacitance of the capacitors Cd1 through Cd4 of the output part 11 into voltages and outputs voltage signals. The output signals of the C/V converter 20 are generated by modulating amplitude of the carrier signal Vs in accordance with the change of capacitance of the capacitors Cd1 through Cd4.

The demodulation/synchronous detector 21 includes a fully differential-type operation amplifier OP2 as a main component. The demodulation/synchronous detector 21 generates a Y-axis vibration signal indicating a vibration component of vibration of the vibrators 6, 7 in the Y-axis direction by demodulating and synchronously detecting the output signal of the C/V converter 20. The Y-axis vibration signal corresponds to a second-axis vibration signal, and thus the demodulation/synchronous detector 21 corresponds to a second-axis vibration extracting part. The Y-axis vibration signal is fed to the servo driver 22 and the output circuit 18.

The servo driver 22 includes a fully differential-type operation amplifier OP3 as a main component. The servo driver 22 generates the driving signals Vsv+, Vsv− for canceling the vibration of the vibrators 6, 7 in the Y-axis direction by amplifying the Y-axis vibration signal with a predetermined gain. The driving signals Vsv+, Vsv− are fed to the fixed electrodes of the capacitors Cs1 through Cs4 of the vibration correcting part 10 through the switching circuit 16, the connecting part 4 and the like.

The output circuit 18 includes a single end-type operation amplifier OP4 as a main component. The output circuit 18 generates an output signal SYAW indicating the degree (amplitude) of the vibration of the vibrators 6, 7 in the Y-axis direction, that is, indicating an angular velocity around the Z-axis, based on the Y-axis vibration signal, which is outputted from the demodulation/synchronous detector 21, and the like. Thus, the output circuit 18 corresponds to an angular velocity detecting part. The output signal SYAW is outputted to an external device via a terminal P8c.

The switching circuit 16 is provided with switches S1 through S4. The switching circuit 17 is provided with switches S5 through S8. One of terminals of the switch S1 and one of the terminals of the switch S2 are commonly connected to a non-inverting output terminal of the servo driver 22. One of the terminals of the switch S3 and one of the terminals of the switch S4 are commonly connected to an inverting output terminal of the servo driver 22.

The other of the terminals of the switch S1 is connected to the terminal P1c and one of the terminals of the switch S5. The other of the terminals of the switch S2 is connected to the terminal P4c and one of the terminals of the switch S6. The other of the terminals of the switch S3 is connected to the terminal P1c and one of the terminals of the switch S7. The other of the terminals of the switch S4 is connected to the terminal P3c and one of the terminals of the switch S8. The other of the terminals of the switches S5 through S8 are commonly connected. On and off states of the switches S1 through S8 are controlled by a control circuit (not shown).

The disconnection detecting circuit 19 serves to detect disconnection of the connection lines L1 through L4 of the connecting part 4, such as a malfunction being in an open state. The disconnection detecting circuit 19 includes a C/V converter circuit 23, a comparator 24 and a determination logic 25. The connection lines L1 through L4 correspond to driving signal transmission lines. The driving signal transmission lines can be provided by flip-chip bonding portions that bonds the sensor chip 2 and the circuit chip 3 to each other. The determination logic corresponds to a determination part.

The C/V converter circuit 23 includes a single end-type operation amplifier OP5, a reference-voltage source 26, an integrating capacitor Cf, and a switch S9. An inverting input terminal of the operation amplifier OP5 is connected to the other of the terminals of the switches S5 through S8, which are commonly connected. A non-inverting input terminal of the operation amplifier OP5 is applied with the voltage Vr (e.g., +2.5 V) outputted from the reference-voltage source 26.

The integrating capacitor Cf and the switch S9 are connected in parallel with each other between the inverting input terminal and the output terminal of the operation amplifier OP5. An output voltage Vcv of the operation amplifier OP5 is, for example, in a range from +2.5 V to +5.0 V, and is applied to the comparator 24.

The comparator 24 compares the voltage Vcv with a predetermined reference voltage, and outputs a voltage Vcmp indicating a compared result. That is, the comparator 24 outputs the voltage Vcmp by level-shifting the voltage Vcv in accordance with a source voltage thereof. The output voltage Vcmp of the comparator 24 is, for example, in a range from 0 V to +5.0 V, and is applied to the determination logic 25.

The determination logic 25 determines disconnection of the connection lines L1 through L4 based on the output voltage Vcmp of the comparator 24. The determination logic 25 outputs a determination signal Sd indicating a different voltage level depending on a determination result to an external device via a terminal 9c. The determination signal Sd indicates a low level L (e.g., 0 V) when the connection lines L1 through L4 have no disconnection. The determination signal Sd indicates a high level H (e.g., +5V) when at least one of the connection lines L1 through L4 has disconnection. Alternatively, depending on a use in a system, the determination signal Sd can indicate a low level L (e.g., 0 V) when at least one of the connection lines L1 through L4 has disconnection, and can indicate a high level H (e.g., +5V) when the connection lines L1 through L4 have no disconnection.

The switches S1 through S9 are, for example, constructed of an analog switch. The switches S1 through S4 can have any size as long as the switches S1 through S4 can sufficiently drive the vibration correcting part 10 of the sensor unit 5. Because the switches S1 through S4 are normally in on state in a normal operation, it is preferable to reduce on resistance. The switches S5 through S8 inputs the carrier signal Vs through the capacitors Cs1 through Cs4. Therefore, the switches S5 through S8 can have any size as long as frequency component of the carrier signal Vs is not attenuated. The switch S9 has a size that can reset electricity charged in the integrating capacitor Cf in a time corresponding to a half of a cycle of the carrier signal Vs. The integrating circuit Cf is configured to have capacitance so that the output voltage Vcv of the C/V comparator 23 exceeds a threshold (reference voltage) of the comparator 24 even if the machined condition, that is, the capacitance of the capacitors Cs1 through Cs4 is the minimum. The comparator 24 has specifications that achieve sufficient response speed to the frequency of the carrier signals Vs.

Next, an operation of the angular velocity sensor 1 will be described also with reference to FIGS. 2 and 3.

In the normal operation for detecting an angular velocity, the vibration signals Vv1 through Vv4 generated in the vibration signal generating part 14 are fed to the vibrating part 9. By the vibration signals Vv1 through Vv4, the capacitors Cv1 through Cv4 generate electrostatic force for displacing the vibrators 6, 7 in the X-axis direction. Thus, the vibrators 6, 7 vibrate in the X-axis direction at the predetermined amplitude and frequency. It is to be noted that, in the normal operation, the disconnection detecting circuit 19 is in a non-operating state.

Also, in the normal operation, all the switches S1 through S4 of the switching circuit 16 are in on state, and all the switches S5 through S8 of the switching circuit 17 are in off state. Therefore, the driving signals Vsv+, Vsv− generated in the control circuit 15 are fed to the vibration correcting part 10 through the connection lines L1 through L4 and the like, and applied to the fixed electrodes of the capacitors Cs1 through Cs4.

Further, the control circuit 15 outputs the Y-axis vibration signal indicating the vibration components of the vibrators 6, 7 in the Y-axis direction, based on the change in capacitance of the capacitors Cd1 through Cd4 in the state where the vibrators 6, 7 are vibrating in the X-axis direction. The output circuit 18 generates the output signal SYAW indicating the angular velocity of the rotation around the Z-axis based on the Y-axis vibration signal.

The control circuit 15 feedback-controls the voltage levels of the driving signals Vsv+, Vsv− so as to restrict the vibration of the vibrators 6, 7 in the Y-axis direction based on the Y-axis vibration signal. That is, the control circuit 15 performs a servo control for restricting the vibration of the vibrators 6, 7 in the Y-axis direction.

For example, the control circuit 15 controls the voltage levels of the driving signals Vsv+, Vsv− so that electrostatic force for restricting the vibrators 6, 7 from vibrating in the Y-axis direction is generated in the capacitors Cs1 through Cs4 of the vibration correcting part 10. Ideally, the control circuit 15 controls the voltage levels of the driving signals Vsv+, Vsv− such that the vibrators 6, 7 are not vibrated in the Y-axis direction, that is, the vibration of the vibrators 6, 7 in the Y-axis direction becomes zero. In this case, since the demodulation/synchronous detector 21 outputs the Y-axis vibration signal indicating the vibration component of the vibration of the vibrators 6, 7 in the Y-axis direction, the output circuit 18 can output the output signal SYAW although the vibrators 6, 7 are not actually vibrated in the Y-axis direction.

In such a control, the vibrators 6, 7 are regularly vibrated in the X-axis direction, and the vibration component of the vibration of the vibrators 6, 7 in the Y-axis direction, which are caused by Coriolis force generated when the angular velocity is applied in a direction around the Z-axis, is extracted. The angular velocity is detected based on the extracted vibration component in the Y-axis direction. Further, by the servo control, the generation of oblique vibration due to the machining error of the vibrators 6, 7 and the like can be reduced, and thus the vibrators 6, 7 can be merely vibrated in the X-axis direction.

The angular velocity sensor 1 performs a first disconnection detecting operation for detecting disconnection of the connection lines L1 through L4, in a case where the servo control for restricting the oblique vibration of the vibrators 6, 7 is performed. The first disconnection detecting operation is performed as follows.

For example, if the connection line L1 has disconnection, the driving signal Vsv+ is not applied to the fixed electrode of the capacitor Cs1, and thus the vibrators 6, 7 are vibrated obliquely. Therefore, the control circuit 15 changes the voltage level of the driving signal Vsv+ so as to restrict the oblique vibration. For example, the voltage level of the driving signal Vsv+ is increased. However, since the connection line L1 has disconnection, the oblique vibration is not reduced even if the voltage level of the driving signal Vsv+ is changed. As a result, the voltage level of the driving signal Vsv+ becomes a level outside of a normally applied voltage range.

In the present embodiment, the disconnection is detected by such an abnormal change in the voltage level. For example, when the driving signal Vsv+ becomes 4.8 V or more, it is determined that there is an abnormality. Also, when the driving signal Vsv− becomes 0.2 V or less, it is determined that there is an abnormality.

In the aforementioned first disconnection detecting operation, the disconnection cannot be detected in the following case. For example, when the vibrators 6, 7 are ideally made, the vibrators 6, 7 merely vibrate in the X-axis in a state where an angular velocity is not applied to the vibrators 6, 7. Therefore, the oblique vibration does not occur. As such, it is not necessary to supply the driving signals Vsv+, Vsv− to the vibration correcting part 10. In such a case, even if the connection lines L1 through L4 have disconnection, an abnormal change in the driving signals Vsv+, Vsv− does not occur, and hence the disconnection cannot be detected in the first disconnection detecting operation.

Considering the aforementioned matter, in the present embodiment, the angular velocity sensor 1 also performs the following second disconnection detecting operation. In FIG. 2, (a) through (c) and (h) schematically show signal waveforms relating to the second disconnection detecting operation. The second disconnection detecting operation begins at a timing t1 where a main clock (internal reference clock) MCK rises for the first time after a disconnection-detection starting signal CHECK shifts from a low level L (e.g., 0 V) to a high level H (e.g., +5 V), as shown in (a) and (b) of FIG. 2. That is, the initial rising of the main clock signal MCK is a trigger of the second disconnection detecting operation. The disconnection-detection starting signal CHCK is fed from a superordinate control device (not shown), which is provided outside of the sensor chip 2, via a terminal (not shown).

Then, at a timing t2 corresponding to a second rising of the main clock signal MCK, an internal disconnection-detection starting signal PRI_SV shifts from a low level L to a high level H. All the switch S1 through S4 are set to off states and the switch S5 is set to the on state at a timing t3 corresponding to the first rising of the main clock signal MCK after the internal disconnection-detection starting signal PRI_SV shifts to the high level H. Thereafter, in a period between the timing t3 and a timing t4 corresponding to the subsequent rising of the main clock signal MCK, a disconnection checking operation for checking disconnection of the connection line L1 is performed.

Figure 3:
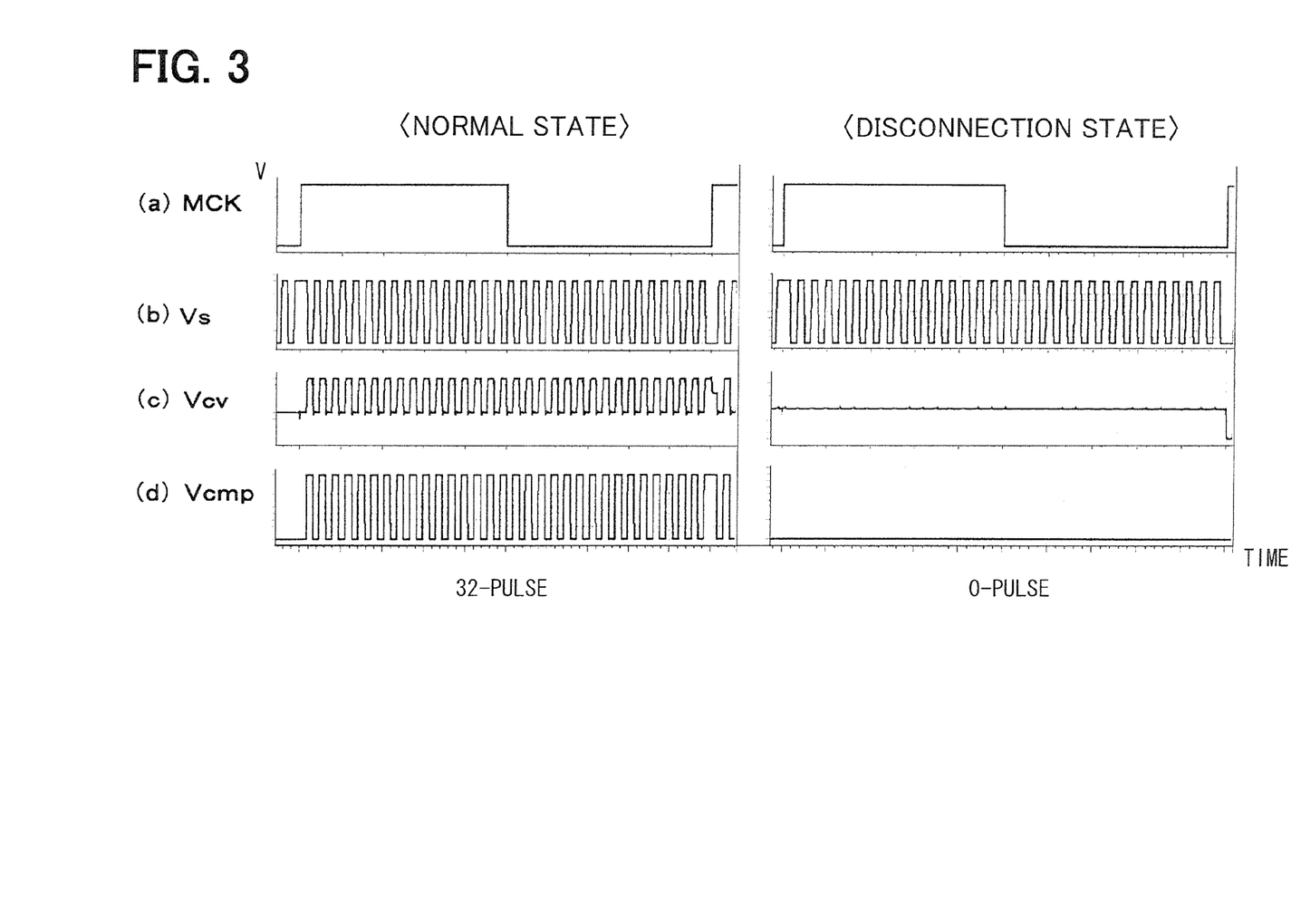
FIG. 3 is a waveform chart relating to a disconnection checking operation according to the first embodiment, in which (a) is the main clock signal, (b) is a carrier signal Vs, (c) is an output voltage of a C/V converter circuit, and (d) is an output voltage of a comparator.

In FIG. 3, (a) through (d) show signal waveforms relating to the disconnection checking operation. Specifically, In FIG. 3, (a) shows the main clock signal MCK, (b) shows the carrier wave signal Vs, (c) shows the output voltage Vcv of the C/V converter circuit 23, and (d) shows the output voltage Vcmp of the comparator 24.

For example, in checking disconnection of the connection line L1, the C/V converter circuit 23 receives the capacitance of the capacitor Cs1 through the connection line L1, the switch S5 and the like, and coverts the capacitance into a voltage to generate the voltage signal. The switch S9 is turned on or off in synchronism with the carrier signal Vs applied to the movable electrode of the capacitor Cs1. Therefore, in an ideal condition, the signal indicating the output voltage Vcv has a rectangular waveform according to a ratio of the capacitance of the capacitor Cs1 and the capacitance of the integrating capacitor Cf.

Therefore, as shown in a left section of FIG. 3, in a normal state where the connection line L1 has no disconnection, the output voltage Vcv of the C/V converter circuit 23 has a rectangular waveform having frequency similar to the frequency of the carrier signal Vs. Also, the output voltage Vcmp of the comparator 24, which is generated by level-shifting the output voltage Vcv, has the similar rectangular waveform. In the present embodiment, for example, the frequency of the rectangular waveform signals is thirty-two times of the frequency of the main clock signal MCK.

On the other hand, in a disconnection state where the connection line L1 has disconnection, the C/V converter circuit 23 cannot receive the capacitance of the capacitor Cs1. Therefore, as shown in a right section of FIG. 3, in the disconnection state, the output voltage Vcv of the C/V converter circuit 23 becomes a constant value (e.g., +2.5 V). Also, as shown in the right section of FIG. 3, the output voltage Vcmp of the comparator 24 becomes a constant value (e.g., 0 V).

Therefore, the determination logic 25 counts the number of pulses of the output voltage Vcmp of the comparator 24. For example, the determination logic counts the number of rising edges or the number of falling edges. The determination logic 25 determines that the connection line L1 has no disconnection when the number of pulses of the output voltage Vcmp is equal to or greater than a predetermined threshold, such as sixteen. On the other hand, the determination logic 25 determines that the corresponding connection line L1 has disconnection when the number of pulses of the output voltage Vcmp is less than the predetermined threshold. In the aforementioned determination, the number of pulses can be suitably changed as long as the change of the output voltage Vcmp or Vcv due to the disconnection can be detected.

If it is determined that the connection like L1 has disconnection in the disconnection checking operation in the period from the timing t3 to the timing t4, the determination signal Sd outputted from the determination logic 25 shifts from a low level L to a high level H at the timing t4. On the other hand, if it is determined that the connection line L1 has no disconnection, the determination signal Sd keeps the low level L.

Further, at the timing t4, the switch S5 is set to the off state, and the switch S6 is set to the on state. Thereafter, in a period to the next rising of the main clock MCK, that is, in a period from the timing t4 to the timing t5, a disconnection checking operation, such as a second disconnection checking operation, for checking disconnection of the connection line L4 is performed.

If it is determined that the connection line L4 has disconnection in the second disconnection checking operation, the determination signal Sd becomes the high level H at the timing t5. Specifically, if the determination signal Sd is at the low level L in the period from the timing t4 to the timing t5, the determination signal Sd shifts from the low level L to the high level H at the timing t5. If the determination signal Sd is already at the high level H in the period from the timing t4 to the timing t5, the determination signal Sd keeps the high level H.

On the other hand, if it is determined that the connection line L4 has no disconnection in the second disconnection checking operation, the determination signal Sd keeps the current level. Specifically, if the determination signal Sd is at the low level L in the period from the timing t4 to the timing t5, the determination signal Sd keeps the low level L. If the determination signal Sd is at the high level H in the period from the timing t4 to the timing t5, the determination signal Sd keeps the high level H.

Thereafter, disconnection checking operations for checking disconnection of the connection lines L2, L3 are performed in periods from the timing t5 through t7, in the similar manner to the first and second disconnection checking operations for the connection lines L1, L4.

In the aforementioned disconnection checking operations, if disconnection is detected in at least one of the connection lines L1 through L4, the determination signal Sd becomes the high level H. Thus, the external control device can determine the disconnection of any of the connection lines L1 through L4 based on the level change in the determination signal Sd. It is to be noted that waveforms (d) through (g) of FIG. 2 show on and off states of the switches S5 through S8.

In the present embodiment, the following advantageous effects are achieved.

The angular velocity sensor 1 is configured to perform the first and second disconnection detecting operations for detecting disconnection of the connection lines L1 through L4, which are provided as driving signal transmission lines for transmitting the driving signals Vsv+, Vsv− for the servo control from the circuit chip 3 to the sensor chip 2. In the second disconnection detecting operation, the C/V converter circuit 23 outputs the voltage Vcv, which is generated by converting the capacitance of the capacitors Cs1 through Cs4 using the carrier signal Vs, and the determination logic 25 determines the disconnection based on the voltage Vcv. Therefore, even if the vibrators 6, 7 are in ideal states, that is, even in a state where the oblique vibration does not occur, the disconnection of the connection lines L1 through L4 can be determined.

In a case where the vibrators 6, 7 are machined ideally, since it is not necessary to apply the electrostatic force (external force) by the servo control, the disconnection of the connection lines L1 through L4 may not cause any troubles. However, the angular velocity sensor 1 is configured to detect the angular velocity based on the Y-axis vibration signal indicating the vibration component of the vibration of the vibrators 6, 7 in the Y-axis direction extracted in the servo control. Therefore, in a case where any of the connection lines L1 through L4 has disconnection, even if an angular velocity is applied, a sensor output cannot be obtained. Therefore, even in a case where the vibrators 6, 7 are machined in the ideal condition, it is important to detect disconnection of the connection lines L1 through L4.

In the angular velocity sensor 1, the sensor chip 2 and the circuit chip 3 are connected through the connection lines of the connecting part 4 by a flip-chip bonding. Therefore, it is difficult to see the condition of the connecting part 4 from the outside. In the present embodiment, even in such a condition, disconnection of the connection lines L1 through L4 of the connecting part 4 can be determined through the aforementioned disconnection detecting operation.

The disconnection detecting circuit 19 has the comparator 24 that generates the voltage Vcmp (e.g., 0 V−+5 V) by converting the level of the output voltage Vcv (e.g., +2.5 V−+5 V) of the C/V converter circuit 23. The determination logic 25 determines the disconnection based on the voltage Vcmp. In such a construction, even if the capacitance of the capacitor Cs1 through Cs4 of the vibration correcting part 10 is very small, the level of the voltage Vcmp for the disconnection determination can be adjusted to a higher level and a waveform of the voltage Vcmp can be adjusted, Therefore, determination accuracy of the determination logic 25 sufficiently improves.

The determination logic 25 counts the number of pulses of the voltage Vcmp, and further the number of pulses of the voltage Vcv. The determination logic 25 determines that the connection line to be detected has disconnection when the number of the pulses is less than the threshold, such as sixteen, and determines that the connection line to be detected has no disconnection when the number of the pulses is equal to or greater than the threshold. In this way, the determination logic 25 determines the disconnection of the connection line based on the counted number of the pulses. That is, since the determination logic 25 quantitatively determines the disconnection of the connection line, determination accuracy further improves.

(Second Embodiment)

A second embodiment of the present invention will be described hereinafter with reference to FIG. 4.

Figure 4:
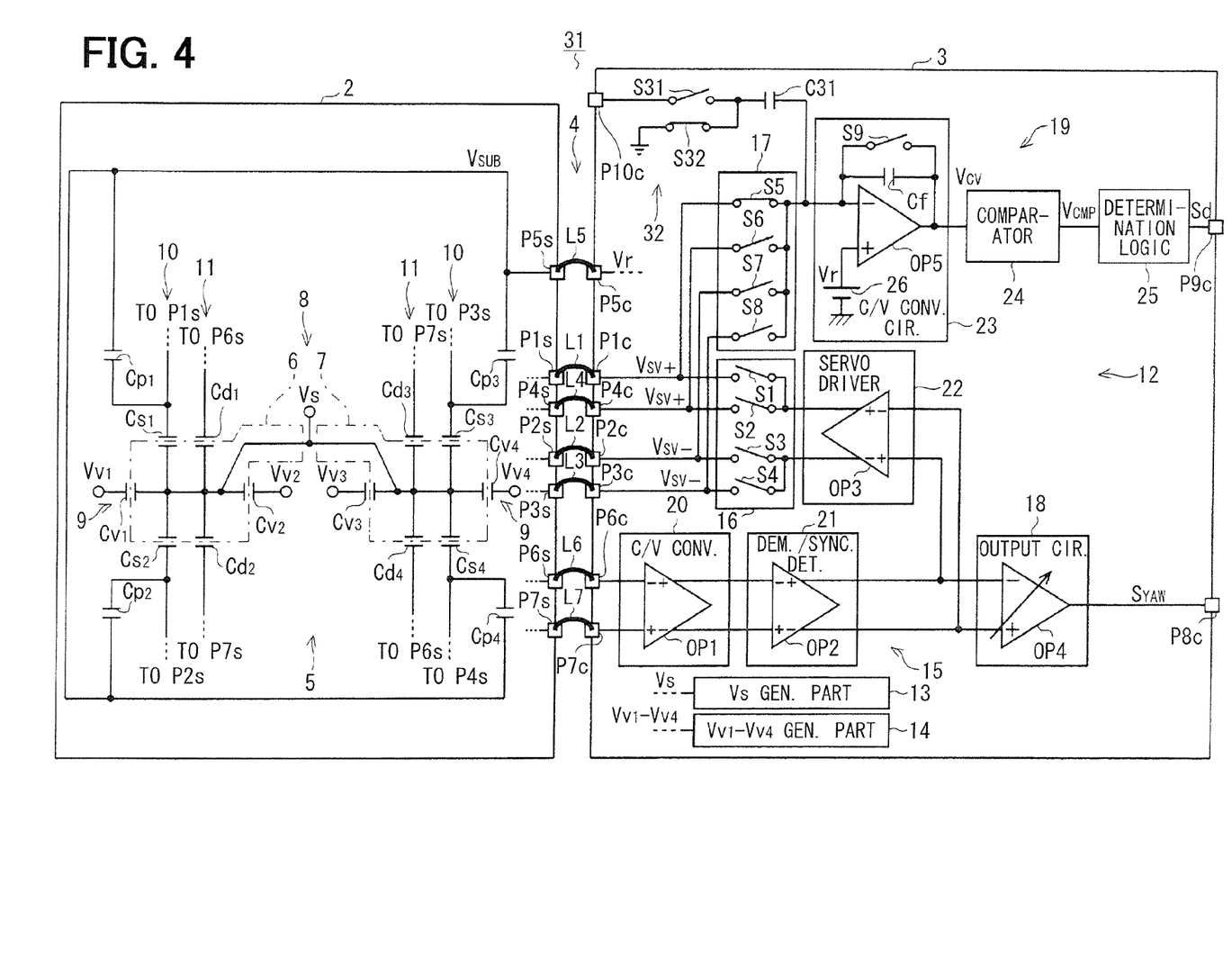
FIG. 4 is a schematic diagram of an angular velocity sensor according to a second embodiment of the present invention.

FIG. 4 is a schematic diagram of an angular velocity sensor 31 according to the second embodiment. In the second embodiment, components similar to those of the first embodiment are designated with like reference numbers, and a description thereof will not be repeated. The angular velocity sensor 31 is different from the angular velocity sensor 1 shown in FIG. 1 because the circuit chip 3 additionally has an inspection circuit 32.

The inspection circuit 32 has a capacitor C31 and switches S31, S32. One of terminals of the capacitor C31 is connected to an inverting input terminal of the operation amplifier OP5 of the C/V converter circuit 23. The other of the terminals of the capacitor C31 is connected to one of terminals of the switch S31 and one of terminals of the switch S32. The other of the terminals of the switch S31 is connected to a terminal P10c of the circuit chip 3.

The other of the terminals of the switch S32 is connected to a ground terminal at ground potential (0 V).

When the angular velocity sensor 31 is normally used, the switch S31 is normally in an off state and the switch S32 is normally in an on state. Therefore, the inspection circuit 32 does not affect a circuit operation of the detection unit 12. Accordingly, the angular velocity sensor 31 can perform the operation similar to that of the angular velocity sensor 1 of the first embodiment.

In addition to the aforementioned operations, the angular velocity sensor 31 has a function of inspecting whether the disconnection detecting circuit 19 is in a normally operable condition or not, for example, in a manufacturing stage.

For example, in a stage before connecting the sensor chip 2 and the circuit chip 3 through the connecting part 4, the switch S31 is set to an on state, and the switch S32 is set to an off state. In this condition, a carrier signal similar to the carrier signal Vs is inputted to the inspection circuit 32 through the terminal P10c as an inspection signal. Therefore, the C/V converter circuit 23 is applied with an input similar to the input that is made in the disconnection detecting operation when the connection lines L1 through L4 are in the normal state. As such, the output voltage Vcmp of the comparator 24 becomes a rectangular waveform signal similar to that of the carrier signal Vs. Further, the determination logic 25 determines that the number of pulses of the voltage Vcmp is equal to or greater than the predetermined threshold (e.g., 16) and keeps the determination signal Sd at the low level L. Thus, when the determination signal Sd is at the low level L, it can be determined that the disconnection detecting circuit 19 is in a normally operable condition.

Accordingly, in the present embodiment, an inspection for inspecting whether the disconnection detecting circuit 19 is in a normally operable condition or not can be performed in the stage before the sensor chip 2 and the circuit chip 3 are electrically connected by the connecting part 4, that is, in a state of wafer. That is, a malfunction of the disconnection detecting circuit 19 formed in the manufacturing stage of the disconnection detecting circuit 19 can be detected. Thus, a situation that the disconnection of the connection lines L1 through L4 cannot be detected due to the malfunction of the disconnection detecting circuit 19 can be avoided.

In a case where the capacitor for the inspection is formed in the circuit chip 3 in a semiconductor manufacturing process, as described above, small capacitance can be accurately detected, and thus detection accuracy improves. Alternatively, the inspection of the disconnection detecting circuit 19 can be performed by externally fixing the capacitor corresponding to the capacitors Cs1 through Cs4 upstream of the connection lines L1 through L4, in the state before the sensor chip 2 and the circuit chip 3 are electrically connected through the connecting part 4.

(Other Embodiments)

The present invention is not limited to the exemplary embodiments described hereinabove and illustrated in the drawings, but can be modified expanded as follows.

The determination logic 25 can determine the disconnection based on the level of the voltage Vcmp. For example, it is determined that the connection line has disconnection when the voltage Vcmp is lower than a predetermined level. Also, it can be determined that there is no disconnection in the connection line when the voltage Vcmp is equal to or higher than the predetermined level. In such a case, the output voltage Vcmp of the comparator 24 can be smoothed by a lowpass filter or the like, and the determination can be made based on the level of the smoothed output voltage.

The comparator 24 is not always necessary as long as the determination accuracy of the determination logic 25 is maintained. In such a case, the determination logic 25 determines the disconnection based on the output voltage Vcv of the C/V converter circuit 23.

The determination logic 25 can be configured so that disconnection information indicating which of the connection lines L1 through L4 has disconnection can be memorized. In such a case, the determination logic 25 can be configured so that the memorized disconnection information can be outputted to an external device.

The first disconnection detecting operation can be performed as necessary.

The connection lines L1 through L4 may be wire or the like. For example, the sensor chip 2 and the circuit chip 3 can be connected to each other by a wire bonding technique.

Additional advantages and modifications will readily occur to those skilled in the art. The invention in its broader term is therefore not limited to the specific details, representative apparatus, and illustrative examples shown and described.

What is claimed is:

1. An angular velocity sensor comprising:
a sensor unit including a movable part that is movable in a first direction along a first axis and a second direction along a second axis, the second axis being perpendicular to the first axis;
a detection unit configured to drive the sensor unit and detect an angular velocity of rotation about a third axis that is perpendicular to the first axis and the second axis; and
a connecting part electrically connecting the sensor unit and the detection unit, wherein
the sensor unit further includes:
a vibrating part configured to vibrate the movable part in the first direction based on a vibration signal supplied from the detection unit;
a vibration correcting part configured to move the movable part in the second direction based on a driving signal supplied from the detection unit; and
an output part configured to generate a detection signal in accordance with vibration of the movable part in the second direction,
the vibration correcting part includes a movable electrode and a driving electrode, the movable electrode being disposed in the movable part and receiving a carrier signal, the driving electrode being opposed to the movable electrode to generate an electrostatic force between the movable electrode and the driving electrode for moving the movable part in the second direction as receiving the driving signal,
the connecting part includes a driving signal transmission line for transmitting the driving signal from the detection unit to the sensor unit, and
the detection unit further includes:
a vibration signal supplying part configured to generate the vibration signal supplied to the vibrating part;

a driving signal supplying part configured to generate the driving signal supplied to the vibration correcting part;

a second-axis vibration extracting part configured to generate a second-axis vibration signal that indicates a vibration component of the movable part in the second direction based on the detection signal generated from the output part in a state where the movable part is vibrated in the first direction;

an angular velocity detecting part configured to detect the angular velocity based on the second-axis vibration signal;

a second-axis vibration restricting part configured to control the driving signal supplying part based on the second-axis vibration signal so that vibration of the movable part in the second direction is restricted;

a C/V converter circuit configured to receive a capacitance between the movable electrode and the driving electrode through the driving signal transmission line in a state where supply of the driving signal to the sensor unit is stopped, and convert the capacitance into a voltage; and a determination part configured to determine whether the driving signal transmission line has disconnection or not based on the voltage outputted from the C/V converter circuit.

2. The angular velocity sensor according to claim 1, wherein the sensor unit is formed in a first semiconductor chip, the detection unit is formed in a second semiconductor chip, and the connecting part is provided by a flip-chip bonding portion bonding the first semiconductor chip and the second semiconductor chip to each other, and the detection unit further includes a switching part configured to input the capacitance between the movable electrode and the driving electrode into the C/V converter circuit while stopping the supply of the driving signal to the sensor unit.

3. The angular velocity sensor according to claim 1, wherein the detection unit further includes a comparator configured to compare the voltage outputted from the C/V converter circuit with a predetermined reference voltage, and the determination part is configured to determine whether the driving signal transmission line has disconnection or not based on a voltage outputted from the comparator.

4. The angular velocity sensor according to claim 1, wherein the determination part is configured to count one of a number of rising edges and a number of falling edges of the voltage outputted from the C/V converter circuit, and determine that the driving signal transmission line has disconnection when the number is less than a predetermined threshold.

5. The angular velocity sensor according to claim 1, wherein the connecting part includes a plurality of driving signal transmission lines including the driving signal transmission line, and the determination part is configured to memorize disconnection information indicating which driving signal transmission line has the disconnection and output the disconnection information to an external device.

6. The angular velocity sensor according to claim 1, wherein the detection unit further includes an inspection circuit configured to input an inspection signal that corresponds to a change in the capacitance to the C/V converter circuit, and the determination part is configured to determine whether a section for determining disconnection of the driving signal transmission line is in a normally operable condition or not based on the voltage outputted from the C/V converter circuit, in a state where the sensor unit and the detection unit are not electrically connected through the connecting part and the inspection circuit is in operation.

7. The angular velocity sensor according to claim 6, wherein the section includes the C/V converter circuit and the determination part at least.

* * * * *